Jan. 23, 1923.

H. P. RYAN.
HOSE CLAMP.
FILED DEC. 27, 1921.

INVENTOR
HENRY. P. RYAN.
BY Fetherstonhaugh & Co
ATTYS.

Patented Jan. 23, 1923.

1,442,909

UNITED STATES PATENT OFFICE.

HENRY PATRICK RYAN, OF VULCAN, ALBERTA, CANADA.

HOSE CLAMP.

Application filed December 27, 1921. Serial No. 524,994.

*To all whom it may concern:*

Be it known that HENRY PATRICK RYAN, a subject of the King of Great Britain, of Vulcan, in the Province of Alberta and Dominion of Canada, has invented certain new and useful Improvements in Hose Clamps, of which the following is a specification.

This invention relates to hose clamps and has for its objects to provide a clamp which is designed to be adjusted by means of a thumb screw, to provide a hose clamp which consists of two semi-circular sections hingedly connected and provided with a yoke carrying a thumb screw designed to lock the two sections together.

Further objects are to provide a hose clamp that is simple in construction, not liable to go out of repair, and to generally adapt the several parts to better perform the functions required of them.

In the drawings.

In the drawings, like characters of reference indicate corresponding parts in all the figures.

Figure 1:
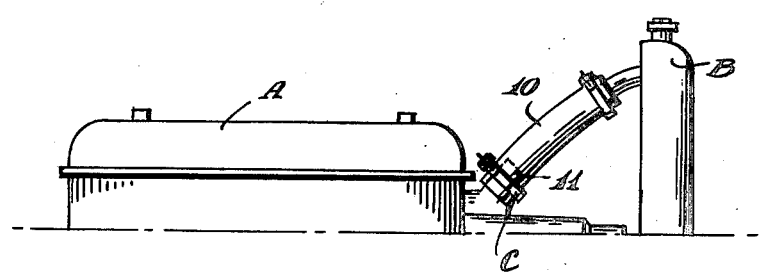
Figure 1 is a side elevation of an internal combustion engine showing the hose connection between the radiator and the water jacket, provided with the improved hose clamp.
Figure 2:
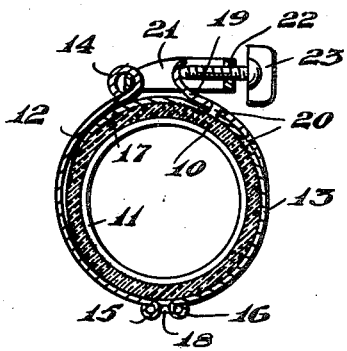
Figure 2 is a cross section taken through the hose clamp.
Figure 3:
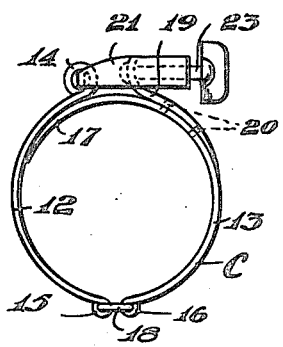
Figure 3 is a side elevation of the improved clamp.
Figure 4:
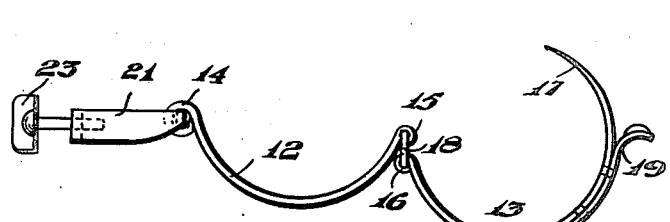
Figure 4 is a side elevation of the improved clamp in open position.

Referring to the drawings:

A represents an internal combustion engine of usual design, the water jacket of which is connected by means of a hose 10 to the radiator B. The hose 10 is fastened to the nipple 11 of the water jacket by means of the improved clamp C. The clamp C consists of two sections 12 and 13 semi-circular in shape. The section 12 has its two opposite ends looped as shown at 14 and 15, and the section 13 is looped as at 16, and its opposite end is provided with a tapered extension 17. The rods 15 and 16 are designed to be engaged by a link 18 which acts as a hinge and connects the two semi-circular sections 12 and 13 together. The tapered portion 17 is provided intermediate of its length with a cup shaped member 19 suitably fastened to the semi-circular section 13 of the clamp, as shown in 20. The looped end 14 of the semi-circular section 12 of the clamp engages a rectangular yoke 21 which is designed to be pivoted and brought into engagement with the cup shaped member 19. The yoke 21 is provided with a screw threaded bore 22 engaging the shank of a thumb screw 23, the end of which is designed to bear against the cup 19 so that when the screw 23 is tensioned, the two free ends of the sections 12 and 13 of the clamp will be brought together and thus locked over the hose 10. When this improved clamp is in use, the section 13 is placed around the hose 10 and the section 12 pivoted over the hinge of the link connection 18 in order to circle the hose and bear against the outer face of the tapered extension 17, the yoke 21 is then pivoted downwardly into engagement with the cup member 19 and a thumb screw 23 being tightened, the end of its shank will bear against the cup 19 and draw the cup towards the looped end 14 of the section 12, thus locking the two sections 12 and 13 together over the hose 10 which is thus securely tightened over the nipple 11 of the water jacket.

It is obvious that this improved clamp could be used for any coupling purpose and may be as efficiently used for coupling two sections of a hose as for coupling a hose to the nipple of the water jacket.

Figure 6:
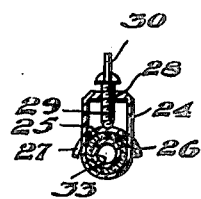
Figure 6 is a cross section taken on the line 5—5, of Figure 5.
Figure 5:
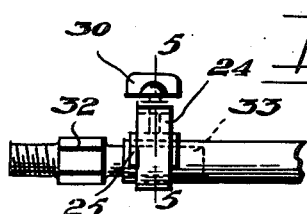
Figure 5 is a side elevation of an alternative form of clamp.
Figure 7:
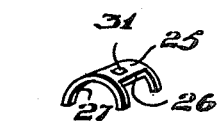
Figure 7 is a perspective view of the semi-circular member used in the alternative form shown in Figure 5.
Figure 8:
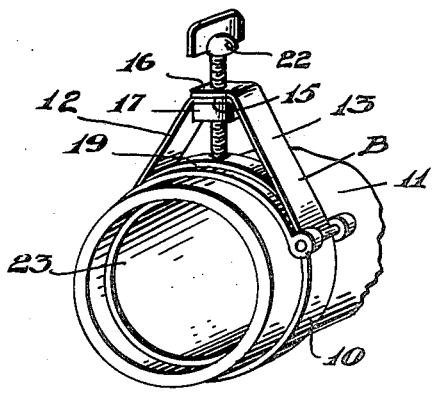
Figure 8 is a perspective view of a further alternative form of hose clamp.
Figures 9, 10:
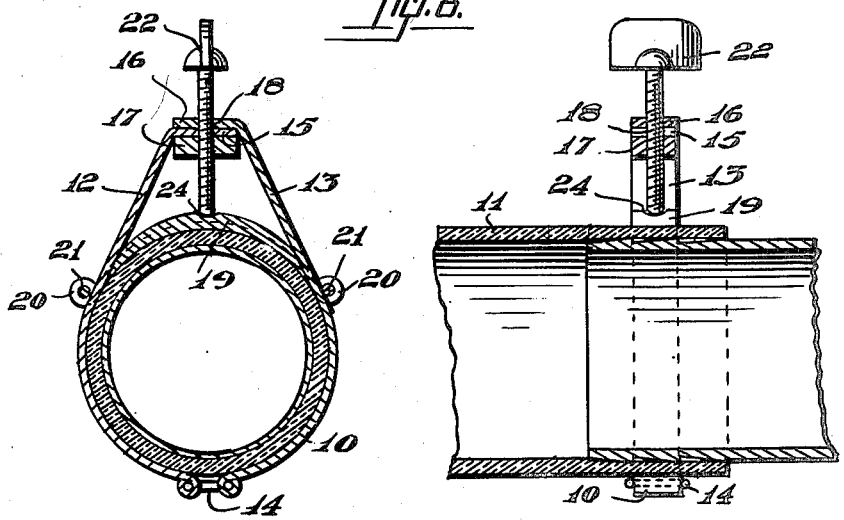
Figure 9 is a cross section through the alternative form of Figure 8.
Figure 10 is a section taken at right angles to that shown in Figure 9.
Figure 11:
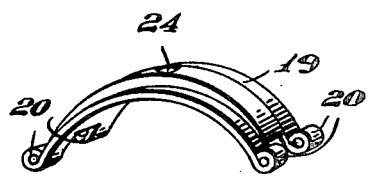
Figure 11 is a perspective view of the curvilinear plate.

Referring to Figures 5 to 7, the improved clamp consists of a yoke member 24 which engages the hose and a semi-circular member 25 having two notches 26 and 27 on its edges engaging the sides of the yoke 24, as shown in Figure 5 of the drawings. The semi-circular member 25 is thus loosely mounted between the walls of the yoke 24 and can not obviously be removed therefrom. The top wall of the yoke 24 is bored as at 28, and the bore 28 being secured thereto is in threaded engagement with the shank 29 of a set screw 30. The rounded end of the shank 29 is designed to engage with the recess 31 formed on the top of the semi-circular member 25.

When this alternative form of clamp is in use and a hose is to be connected to the member 32 as shown in Figure 5 of the drawings, the yoke 24 is slipped over the hose portion and the member 32 is then connected to the hose with its nipple 33 engaged therein. The yoke 24 is then slipped on top of the nipple 33 and the set screw 30 being tightened, the end of the shank 29 thereof will engage the recess 31 and press the semi-circular member 25 into engagement with the hose and tighten the same securely against the hose and nipple 33. This obviously will secure a tight joint between the member 32 and the hose and this joint may be easily undone by loosening the set screw 30 thus relieving the hose and nipple 33 from the pressure exerted by the semi-circular member 25.

Referring to the alternative form shown in Figures 8 to 11 inclusive of the drawings. B designates the improved clamp comprising a yoke 10 designed to engage the hose portions 11. The yoke 10 is formed in two sections 12 and 13 hingedly connected by the link 14 on the lower part of the hose 11. The yoke members 12 and 13 extend obliquely upwardly and are provided with offset portions 15 and 16 designed to bear one on top of the other. The offset portion 15 is designed to be formed integrally or otherwise provided with a nut 17. The offset portions 15 and 16 are bored as at 18 and the bore 18 is designed to register with a threaded bore of the nut 17.

A curvilinear plate 19 is provided which is designed to bear on top of the hose portion 11 and is formed at each end thereof with attaching ears 20 which are bored and engaged by a cotter pin 21.

As is obvious from the illustration, the curvilinear plate 19 is located underneath the extensions 12 and 13 of the yoke member and the cotter pin 21 bears against the outer part of the extensions 12 and 13 so that the curvilinear plate 19 is thus slidably mounted on the extensions of the yoke. The bore 18 and the threaded bore of the nut 17 are designed to be engaged by the shank of the set screw 22.

When this alternative form of hose clamp is being used, the section of the hose which is to be tightened over a tube or pipe 23 is fitted with the yoke 10 and the curvilinear plate 19 being lowered is brought into bearing engagement with the top of the hose member 11 and the set screw 22 being then engaged with the bore of the nut 17 is tightened down until the rounded end of its shank comes into engagement with a recess 24 provided in the middle part of the curvilinear plate 19. It is obvious that the curvilinear plate 19 being slidably mounted on the extending arms 12 and 13 of the yoke 10, the said plate will be forced down against the hose 11 by the tightening of the set screw 22. As the two portions 12 and 13 of the yoke 10 are hingedly connected by the link 14, it will be seen that the clamp would be adapted to fit with a small range of differently sized hose.

As many changes could be made in the above construction and many widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:—

1. A hose clamp comprising a ring formed of two sections hingedly connected, one of the sections being looped at one of its ends, a hook provided on the adjacent end of the second section, a yoke member designed to be pivoted into engagement with the hook, and means to lock the yoke against the hook, as and for the purpose specified.

2. A hose clamp comprising a ring formed of two sections, one of the sections being formed with looped ends, the second section being also formed with a loop at one end and at the other end with a tapered curved extension designed to extend underneath the other section, a link engaging the adjacent looped ends of the two sections, a cup shaped member fastened on the tapered extension, a yoke carried by the free loop of the linked section designed to engage the cup shaped member, and a thumb screw in threaded engagement with the yoke designed to press the cup in order to lock the ring sections together.

In witness whereof I have hereunto set my hand in the presence of two witnesses.

HENRY PATRICK RYAN.

Witnesses:
GEORGE MORTIMER WHICKS,
ALBERT JAMES FLOOD.